United States Patent [19]

Hanslik

[11] 4,408,888

[45] Oct. 11, 1983

[54] DOUBLE-WORM EXTRUSION PRESS

[75] Inventor: Wilhelm Hanslik, Vienna, Austria

[73] Assignee: American Maplan Corporation, McPherson, Kans.

[21] Appl. No.: 319,657

[22] Filed: Nov. 9, 1981

[30] Foreign Application Priority Data

Nov. 10, 1980 [AT] Austria ................................ 5508/80

[51] Int. Cl.³ .............................................. B29B 1/10
[52] U.S. Cl. ...................................... 366/83; 366/88; 366/89; 366/91; 366/97; 366/290; 366/296
[58] Field of Search ...................... 366/83, 84, 85, 88, 366/89, 292, 323

[56] References Cited

U.S. PATENT DOCUMENTS

| | | | |
|---|---|---|---|
| 3,104,420 | 9/1963 | Selbach | 366/85 |
| 3,929,322 | 12/1975 | Hanslik | 366/85 |
| 4,047,705 | 9/1977 | Hanslik | 366/85 |

*Primary Examiner*—Robert W. Jenkins
*Assistant Examiner*—Arthur D. Dahlberg
*Attorney, Agent, or Firm*—Karl F. Ross; Herbert Dubno

[57] ABSTRACT

A double-worm press, especially an extrusion or plastifying press for thermoplastic materials and particularly high viscosity thermoplastics, has generally conical worms, at least the discharge zones of which are formed so that the material is treated generally adiabatically therein. For this purpose, the end of the discharge zone has a depth of the worm flight which is between 24 and 33% of the worm diameter, preferably between 26 and 30%, with the ratio of the depth of the flight (or height) to the diameter of the worm increasing progressively away from the discharge end, counter to the direction of feed of the material.

1 Claim, 2 Drawing Figures

DOUBLE-WORM EXTRUSION PRESS

FIELD OF THE INVENTION

My present invention relates to a double-screw extrusion press and, more particularly, to a double-worm press for the plastifying, mastication and extrusion of thermoplastic materials and particularly high viscosity thermoplastics.

BACKGROUND OF THE INVENTION

In the synthetic resin (plastic) industry, screw or worm presses have been developed for plastifying, masticating, displacing and extruding synthetic resin materials, particularly thermoplastics, and for mixing or otherwise treating these materials by mechanical and, where necessary, a combination of mechanical and thermal techniques.

The development of worm or screw presses for this purpose will be discussed in greater detail below, although initially some definitions are in order.

Thus, while reference may be made to extrusion presses herein, it should be noted that such presses are not limited to the production of extruded products since an extrusion press for preparing thermoplastic materials can also be employed in injection molding, blow molding and other applications common in the thermoplastics field. For example, the products may be extruded by a press through a die imparting the final shape or the extrusion press may simply prepare the feed for an injection-molding or blow-molding installation.

Reference will also be made herein to the screws or worms of such presses. For the purpose of this description, a screw or worm will be considered to be an elongated body having one or more helical ribs or spiral ribs which may have a screw thread profile or can deviate from such profile and which, when rotated, tends to advance a thermoplastic material through a worm housing from an inlet end to a discharge end. Each such rib will be considered a "flight" by analogy with the ribs of worm conveyors.

Naturally each flight will have a number of turns, the inter-turn spacing defining the pitch of the worm or screw. The outermost portion of each flight is referred to as the crest and low point between turns can be termed the root, the height or depth of the flight being equal to the radial distance between the root and the crest and being equal to $(D - D'/2)$ where D is the outer diameter of the worm and $D'$ is the root diameter. The flight height (or depth) can be represented by d.

As noted, the profile of the flight may be similar to that of a screw thread and, in practice, this profile will be generally trapezoidal. Each turn will therefore have two flanks which are inclined outwardly toward one another, the flank facing in the direction of advance of the material being termed the pressure flank because it provides the forward impetus to the material, the other flank of each turn being referred to as the trailing flank. Each flank includes an angle with a perpendicular to the axis of the worm, this angle being termed the flank angle.

For various configurations of worm presses, their applications, construction, drives and configurations, reference may be had to the publications discussed in the expanded consideration of the background below, and in the prior U.S. Pat. Nos. 3,913,897, 3,927,869, 3,929,322, 3,969,956 and 4,047,705. Reference may also be made to the publications in the files of these patents and in the classes to which these patents have been assigned in the Manual of Patent Classification.

Early use of screw or worm presses for polyolefins utilized single worm presses in which a worm or screw press having a cylindrical configuration primarily and one or more helical flights was driven to displace a granular or pulverulent polyolefin material, primarily polyethylene, from a hopper at the inlet end of the press to an outlet at the opposite end from which a continuous strand of the polyolefin emerged.

The flight depth, pitch and configuration were so selected that the mass was subjected to considerable shear with heat being generated by the friction of the shear energy and compression. It was possible to develop these parameters so that, without external heating, the polyolefin mass reached the desired plastification temperature.

Certain relationships were discovered at such early dates. For example, it was found that the stiffer the mass, the deeper the worm flight required. In practice, however, it was not possible to select the structural parameters which always resulted in the appropriate temperatures and thus a certain contribution to the energy was generally provided by controlled heating and by constriction of the flow of the material from the press or by increase of the residence time.

The viscosity of a polyolefin, moreover, drops sharply in the region of the extrusion temperature and hence the shearing energy likewise varies along the length of the path. Excess temperatures can develop close to the discharge end because of the viscosity drop and in practice it is required to cool the discharge end because the depth of the flight cannot be reduced beyond the level required for displacement of the material.

It has also been found that the handling of hard polyvinyl chloride (PVC) by single screw worm presses is only economical with very small machines of limited capacity. Hard PVC is not only stiffer than most polyolefins, it is also thermally unstable and reacts to overheating by adhesion to the worm, thermal decomposition and combustion with strong evolution of hydrogen chloride.

Because of this, double-screw worm presses have been developed, such presses having two intermeshing counter-rotating worms. These presses have increased the rate at which hard PVC could be treated. The presses had a worm length of 10 to 12 times the diameter and, while the flight height, output per revolution and rotational speed were small, only a simple drive was required for the two parallel worms and productivity was increased.

However, efforts to increase the speed, reduce the interaxial spacing of the worm, and the like to permit greater flight heights and outputs to be developed, fail for one or more reasons. For example, when the shafts of the worms were brought too closely together, extreme complex transmissions were required to drive the worms.

In addition, excessive length, deep flights and large pitches resulted in weakening the worms such that the weak points were not their drive gears or bearings, but rather the worm shaft or body of the worm itself.

The worms were incapable of effectively withstanding the high driving torque, enormous backpressure and non-uniform wear of the flights and the cylinder or housing in which the worms were rotated.

Indeed, the worms themselves were weakened by the need to provide cooling channels through the cores of the worms and breakage frequently resulted.

The depth of the flight was found to be limited by practical considerations, namely, the drive requirements and the strength and stability of the worm or its shaft.

The excess energy developed in the handling of PVC at high speeds at the discharge zone are extracted by cooling of the cylinder and the worm if thermal decomposition of the PVC is to be avoided. This is also a handicap since cooling of the cylinder may be inconvenient, but cooling of the worm is extremely complex and, where the desired temperatures cannot be maintained, such cooling must be supplemented by control actions such as a reduction in the throughput of the press. All of these requirements detrimentally influenced the output of the apparatus and increased production costs.

Thus the art has come forward with conical worms as a means of avoiding the disadvantages of the double-worm systems previously discussed. The double conical worm system permits the axes of the two worms to be inclined to one another and hence to have a progressively increasing spacing away from the discharge end of the press. The interaxial spacing in the region of the drive wheels and bearings can be comparatively large so that the drive system is relatively simple. The peripheral speeds at the upstream end of the worms, for a given angular velocity, are comparatively large while the peripheral speeds at the discharge ends are correspondingly small, thereby providing a more effective energy distribution, since most of the shear, compression and friction heat is developed at the upstream end while minimum shear energy is developed at the downstream end.

Nevertheless experience has shown that excess energy may still develop at the downstream or discharge end and that such presses have not fully eliminated all of the disadvantages of the earlier systems. Attempts have been made in this direction (see German patent document DE-OS No. 24 46 420 and Austrian Pat. No. 356,882) with only partial success.

OBJECTS OF THE INVENTION

It is the principal object of the present invention to provide an improved double-worm extrusion press, especially for high viscosity thermoplastics such as polyvinyl chloride, whereby disadvantages of earlier systems are obviated, the danger of overheating at the discharge end is precluded and a more effective preparation of the material can be insured.

Still another object of this invention is to provide an improved double-screw extrusion press which operates with reduced wear of and strain upon the worms even with prolonged operations.

SUMMARY OF THE INVENTION

I have found, quite surprisingly, that under certain conditions a double-screw or double-worm extrusion press having generally conical worms rotated in opposite directions can be dimensioned so as to practically preclude wear during prolonged operations and at the same time delivers no, or practically no, excess energy to the thermoplastic materials in the discharge zone when the flight height or depth is 24 to 33%, preferably 26 to 30%, of the outer diameter of each worm at the downstream end (in the flow direction) of the discharge zone.

Furthermore, it is highly advantageous to provide the flights so that the ratio of the flight height or depth to the diameter decreases in the opposite direction and the pitch of each flight along the worm and the widths of the flights are such that the flank gaps between the worms progressively increase in this direction, i.e. in the direction in which the worms taper and continuously from the large base of each worm toward the tip thereof.

For best results, the flank angles of the worms can be 10° to 25° and can diminish continuously or constantly (monotonically) in the direction of the taper of the worm.

Rather than flat or line contact between the meshing worms, I provide, in accordance with another feature of the invention, for the juxtaposed flanks of the two worms to include an angle with one another. The core or root of each worm should lie along a conical surface.

The result is an extrusion press which suffers significantly less wear, even with long-term usage, that has hitherto been the case and, in addition, practically no excess heat is generated in the mass at the discharge zone so that complex cooling is avoided.

BRIEF DESCRIPTION OF THE DRAWING

The above and other objects, features and advantages of the present invention will become apparent hereinafter from the following description, reference being made to the accompanying drawing in which.

SPECIFIC DESCRIPTION

Figure 1:
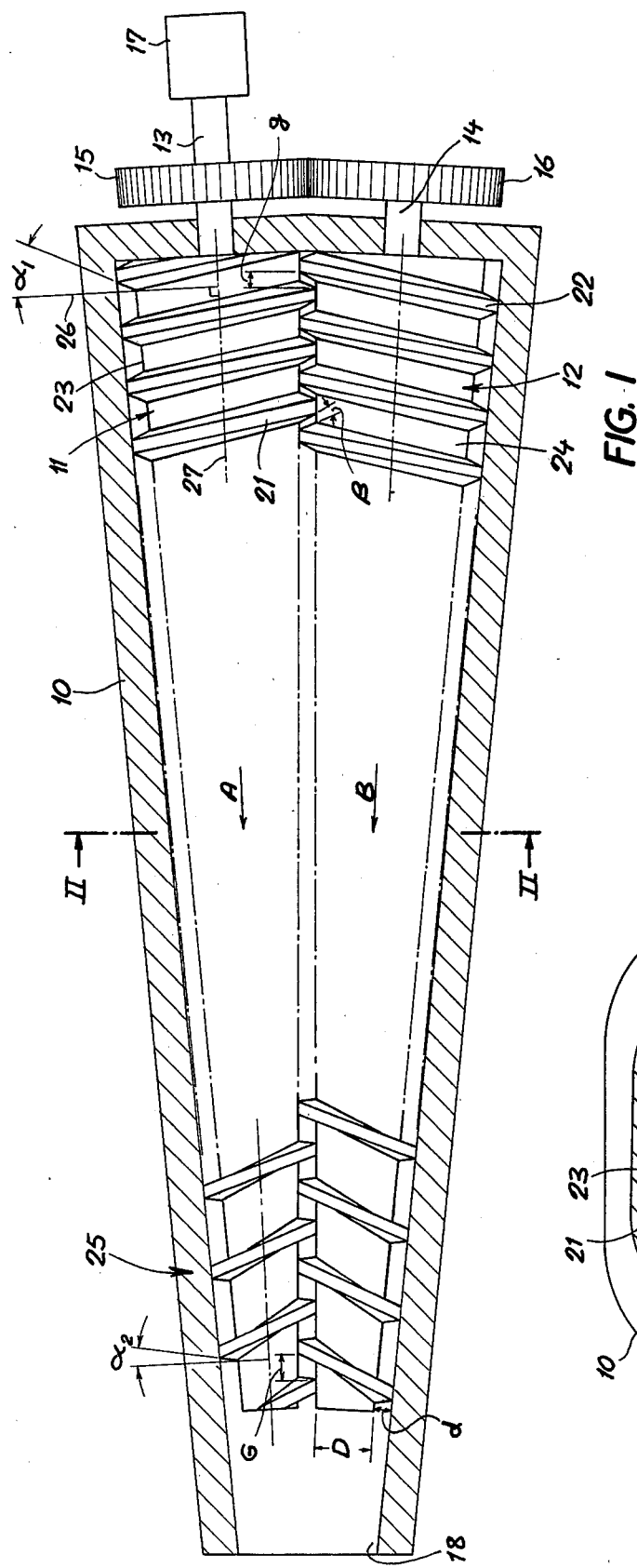
FIG. 1 is a somewhat diagrammatic longitudinal section through the worm housing of a double-screw extrusion press according to the invention.
Figure 2:
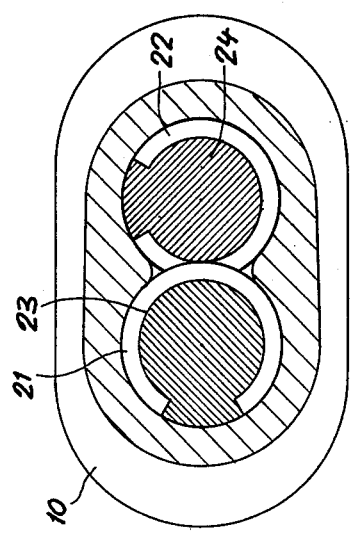
FIG. 2 is a section taken along the line II—II of FIG. 1.

The worm housing 10 of an extrusion press in accordance with the invention can receive a pair of generally conical worms 11, 12 whose shafts 13, 14 are journaled in the housing at the material-feed end in bearings (not shown) and carry gears 15, 16 enabling the two worms to be counter-rotated when one is driven by the motor diagrammatically shown at 17.

The opposite end of the housing has an outlet 18 from which the thermoplastic material may be extruded.

The principles of operation and applications of the extruder are the same as those discussed in U.S. Pat. No. 4,047,705 and the other references mentioned.

Each worm 11, 12 is formed with a spiral flight 21, 22 extending continuously over a length of the worm which may have a length between 10 and 15 times the mean diameter thereof and rising from a root 23, 24 lying along a conical surface.

The flight cross section is generally trapezoidal and has a flank angle $\alpha$ which can range from $\alpha_1 = 25°$ at the broad base of each worm to $\alpha_2 = 10°$ at the discharge end 25 of the worms, this flank angle being measured between the flank and a perpendicular 26 to the axis 27 of the worm.

Juxtaposed flanks of the two worms, where the flights interfit, include acute angles $\beta$ with one another and in these regions, the flights of the two worms are separated by gaps G which can increase progressively in the direction of taper and material feed (arrows A and B) by about 40% over the length of the worm.

In the discharge zone the flight depth or height d is in a ratio to the outer diameter D at the downstream end of the discharge zone such that $d/D \times 100 = 24$ to 33%, preferably 26 to 30%, i.e. the dimension d is 24 to 33%, preferably 26 to 30%, of the dimension D.

The surprising results which have been obtained were discovered based upon the development of new concepts in worm presses worked out from motors of the torque requirement over the length of the worm.

It was discovered, for example, that the power development of a worm press with meshing counter-rotating worms in the discharge zone and hence the heat development therein is dependent upon the following factors:
1. The hydraulic pressability;
2. The friction resulting from pressing of the worm against the cylinders in the housing;
3. The drag flow in the C-shaped material chamber;
4. The shear between the periphery of the worm and the cylinder;
5. The shear due to differential speeds between the meshing flanks as well as the core and flight periphery.

Working with these factors it was discovered that it was necessary to treat a double-worm system as inherently capable of higher heat development than a single worm system.

Based upon the fact that PVC undergoes a gel transformation under a temperature of 120° to 140° C. in a pressure build-up region of the discharge zone and the temperature in this zone can reach 180° to 190° C., it was determined from the enthalpy of the PVC that the thermal requirements were about 30 W/kg of the PVC.

By then utilizing different depths of the flight and rheological residence of the material of 300 bar, a coefficient of friction of 0.1 and a mean viscosity of 0.2 kps/cm$^2$, it was discovered that an adiabatic operation could be obtained with extremely large flank heights.

Such severe flank heights over the length of the worm weakened the latter and further investigation showed that the torque requirement of the worm amounted to 40 to 50% upstream of the discharge zone with the remaining 50 to 60% in the 4 to 5 turns of the flight in the discharge zone and that this torque was converted largely to heat.

The worm was then considered to be broken down into zones with the following torque distribution:
Preplastification zone upstream of the discharge zone = 40%;
Discharge zone:
First turn = 20%;
Second turn = 17%;
Third turn = 13%;
Fourth turn = 10%.
(The turns being counted from the upstream end.)

Bearing these values in mind and that it was important to prevent overstressing of the steel of the worms toward the narrow end of the worms, it was discovered quite surprisingly that the entire zone could be made to operate in an adiabatic manner. For example, it was found to be essential for this purpose that of course, depending upon the viscosity and the material used, the flight depth should be between $\frac{1}{4}$ and $\frac{1}{3}$ of the flight diameter. Reduced depths can give rise to overheating while larger depths result in problems with the output and create the possibility of mechanical failure.

Utilizing the principles of the invention, therefore, I am able to increase the economy of the steel used for the worms, reduce the energy requirements per kg of extruded product, increase the quantity of extruded product per revolution of the worm, carry out a more homogeneous plastification for a given energy consumption, maintain the uniformity of the output so that the latter does not vary in density, eliminate cylinder and worm cooling, and eliminate the need to control the feed of the material to the press.

I claim:

1. A double-worm extrusion press, especially for high viscosity thermoplastic material comprising:
   an elongated worm housing formed with an outlet at one end thereof;
   a pair of meshing worms conically tapering toward said end, each of said worms having a flight with flank angle between 10° and 25° rising from a root of the respective worm and extending spirally over the length thereof, a plurality of turns of each flight forming a discharge zone at an extremity of the worm proximal to said end, the flight height/worm diameter ratio over said zones decreasing in a direction opposite the direction of flow of said material through said housing, the height of the flight of each worm at the downstream end of each zone being between 26 and 30% of the worm diameter at said downstream end; and
   means for counter-rotating said worms to advance a thermoplastic material through said housing, substantially adiabatically through said zones, and out of said housing through said opening, the worm flights defining between them flank gaps which progressively increase in the direction of taper of said worms, said flank angle continuously diminishing in the direction of taper of each worm and the flanks of the two worms including angles between them.

* * * * *